US012664895B2

(12) United States Patent
Shao et al.

(10) Patent No.: US 12,664,895 B2
(45) Date of Patent: Jun. 23, 2026

(54) METHOD, INTERNET OF THINGS SYSTEM AND STORAGE MEDIUM FOR DETERMINING STREET CLEANING ROUTE IN SMART CITY

(71) Applicant: CHENGDU QINCHUAN IOT TECHNOLOGY CO., LTD., Chengdu (CN)

(72) Inventors: Zehua Shao, Chengdu (CN); Haitang Xiang, Chengdu (CN); Bin Liu, Chengdu (CN); Xiaojun Wei, Chengdu (CN); Lei Zhang, Chengdu (CN)

(73) Assignee: CHENGDU QINCHUAN IOT TECHNOLOGY CO., LTD., Chengdu (CN)

( * ) Notice: Subject to any disclaimer, the term of this patent is extended or adjusted under 35 U.S.C. 154(b) by 277 days.

(21) Appl. No.: 18/452,531

(22) Filed: Aug. 19, 2023

(65) Prior Publication Data

US 2023/0394974 A1 Dec. 7, 2023

Related U.S. Application Data

(63) Continuation of application No. 18/063,642, filed on Dec. 8, 2022, now Pat. No. 11,776,409.

(30) Foreign Application Priority Data

Oct. 24, 2022 (CN) ......................... 202211307812.1

(51) Int. Cl.
*G08G 1/00* (2006.01)

(52) U.S. Cl.
CPC ............... *G08G 1/202* (2013.01); *G08G 1/22* (2013.01)

(58) Field of Classification Search
CPC ........ G08G 1/202; G08G 1/22; G06Q 10/047; G06Q 10/063; G06Q 50/26; G06Q 10/103; G16Y 10/35
See application file for complete search history.

(56) References Cited

U.S. PATENT DOCUMENTS

2022/0187841 A1 6/2022 Ebrahimi Afrouzi et al.
2023/0057149 A1 2/2023 Cristache

FOREIGN PATENT DOCUMENTS

AU 2020102191 A4 10/2020
CN 108086214 A 5/2018
(Continued)

OTHER PUBLICATIONS

Li, Jiahui, Recognition of Pavement Garbage on Sweeping Vehicle and Research on Loading System Energy Saving Strategy, Chinese Master's Theses Full-text Database Engineering Science and Technology Series II, 2020. 83 pages.
(Continued)

*Primary Examiner* — Navid Z. Mehdizadeh
(74) *Attorney, Agent, or Firm* — Metis IP LLC

(57) ABSTRACT

Some embodiments of the present disclosure provide a method, an Internet of Things system, and a storage medium for determining a street cleaning route in a smart city. The method may include obtaining street monitoring information of a target area; determining distribution of fallen leaves on the street; determining cleaning difficulty of each street in the target area; determining, based on the total amount of fallen leaves and the cleaning difficulty, at least one street to be cleaned from the target area; determining the continuous action sequence including cleaning actions for each of the streets to be cleaned; for any continuous action sequence of the at least one continuous action sequence, determining a reward value of each cleaning action of the continuous action sequence, and determining the return value of each (Continued)

continuous action sequence; and determining the fallen leaf cleaning route of the target area.

15 Claims, 5 Drawing Sheets

(56) References Cited

FOREIGN PATENT DOCUMENTS

| | | | |
|---|---|---|---|
| CN | 207749457 | U | 8/2018 |
| CN | 109165582 | A | 1/2019 |
| CN | 109858331 | A | 6/2019 |
| CN | 110335485 | A | 10/2019 |
| CN | 111598476 | A | 8/2020 |
| CN | 112187492 | A | 1/2021 |
| CN | 114358660 | A | 4/2022 |
| CN | 114429315 | A | 5/2022 |
| CN | 114529062 | A | 5/2022 |
| WO | 2022133330 | A1 | 6/2022 |

OTHER PUBLICATIONS

Jiang, Yan, Application of Internet of Things Technology in Smart Community Construction, Construction Engineering Technology and Design, 2017, 2 pages.
First Office Action in Chinese Application No. 202211307812.1 mailed on Dec. 23, 2022, 13 pages.
Notification to Grant Patent Right for Invention in Chinese Application No. 202211307812.1 mailed on Jan. 17, 2023, 5 pages.

Process 300

Process 400

METHOD, INTERNET OF THINGS SYSTEM AND STORAGE MEDIUM FOR DETERMINING STREET CLEANING ROUTE IN SMART CITY

CROSS-REFERENCE TO RELATED APPLICATIONS

This application is a continuation of U.S. application Ser. No. 18/063,642, filed on Dec. 8, 2022, which claims priority of Chinese Patent Application No. 202211307812.1, filed on Oct. 24, 2022, the entire contents of each of which are hereby incorporated by reference.

TECHNICAL FIELD

The present disclosure relates to the field of smart cities, and in particular to, a method, an Internet of Things system, and a storage medium for determining a street cleaning route in a smart city.

BACKGROUND

With full promotion of carbon neutrality goals, the density of trees in cities (especially street trees on both sides of streets) is gradually increasing. In an annual fallen leaf season, a large number of fallen leaves are scattered on pavements of streets, affecting an appearance of a city and normal passage of vehicles or citizens.

Therefore, how to plan a cleaning route of fallen leaves and improve the cleaning efficiency of the street surface is an urgent technical problem to be solved in the art.

SUMMARY

One or more embodiments of the present disclosure provide a method for determining a street cleaning route in a smart city implemented based on an Internet of Things system for street management in a smart city. The Internet of Things system for street management in a smart city may include a management platform, a sensor network platform, and an object platform. The method may be executed by the management platform. The method may include: obtaining, based on the object platform, street monitoring information of a target area through the sensor network platform; determining, according to the street monitoring information, distribution of fallen leaves on the street, the distribution of fallen leaves including a total amount of fallen leaves and a count of fallen leaf piles; determining, based on the distribution of fallen leaves, cleaning difficulty of each street in the target area; determining, based on the total amount of fallen leaves and the cleaning difficulty, at least one street to be cleaned from the target area; determining, based on the at least one street to be cleaned, at least one continuous action sequence, the continuous action sequence including cleaning actions for each of the streets to be cleaned; for any continuous action sequence of the at least one continuous action sequence, determining a reward value of each cleaning action of the continuous action sequence by processing the continuous action sequence based on a preset evaluation function, and determining the return value of each continuous action sequence of the at least one continuous action sequence by recording a total reward value of each cleaning action of the continuous action sequence as a return value of the continuous actions; and determining, according to each continuous action sequence of the at least one continuous action sequence and the return value of each continuous action sequence, the fallen leaf cleaning route of the target area.

In some embodiments, the Internet of Things system for determining a street cleaning route in a smart city may further include a user platform and a service platform. The management platform may include at least one management sub-platform. The sensor network platform may include at least one sensor network platform. One of the at least one sensor network sub-platform may correspond to one of the target areas. One of the at least one management sub-platform may correspond to one of the sensor network sub-platforms. The street monitoring information of the target area may be obtained based on the object platform and transmitted to the management sub-platform corresponding to the sensor network sub-platform based on the sensor network sub-platform corresponding to the target area. The method may further include: sending the fallen leaf cleaning route to the user platform through the service platform.

One or more embodiments of the present disclosure provide an Internet of Things system for determining a street cleaning route in a smart city. The Internet of Things system for determining a street cleaning route in a smart city may include a management platform, a sensor network platform, and an object platform. The management platform may be configured to: obtain, based on the object platform, street monitoring information of a target area through the sensor network platform; determine, according to the street monitoring information, distribution of fallen leaves on the street, the distribution of fallen leaves including a total amount of fallen leaves and a count of fallen leaf piles; determine, based on the distribution of fallen leaves, cleaning difficulty of each street in the target area; determine, based on the total amount of fallen leaves and the cleaning difficulty, at least one street to be cleaned from the target area; and determine, based on the at least one street to be cleaned, at least one continuous action sequence, the continuous action sequence including cleaning actions for each of the streets to be cleaned; for any continuous action sequence of the at least one continuous action sequence, determine a reward value of each cleaning action of the continuous action sequence by processing the continuous action sequence based on a preset evaluation function, and determine the return value of each continuous action sequence of the at least one continuous action sequence by recording a total reward value of each cleaning action of the continuous action sequence as a return value of the continuous actions; and determine, according to each continuous action sequence of the at least one continuous action sequence and the return value of each continuous action sequence, the fallen leaf cleaning route of the target area.

One or more embodiments of the present disclosure provide a non-transitory computer-readable storage medium storing computer instructions. When the computer instructions are executed by a processor, a method for determining a street cleaning route in a smart city may be implemented.

BRIEF DESCRIPTION OF THE DRAWINGS

The present disclosure is further illustrated in terms of exemplary embodiments. These exemplary embodiments are described in detail with reference to the drawings. These embodiments are non-limiting exemplary embodiments, in which like reference numerals represent similar structures, wherein.

DETAILED DESCRIPTION

Figure 1:
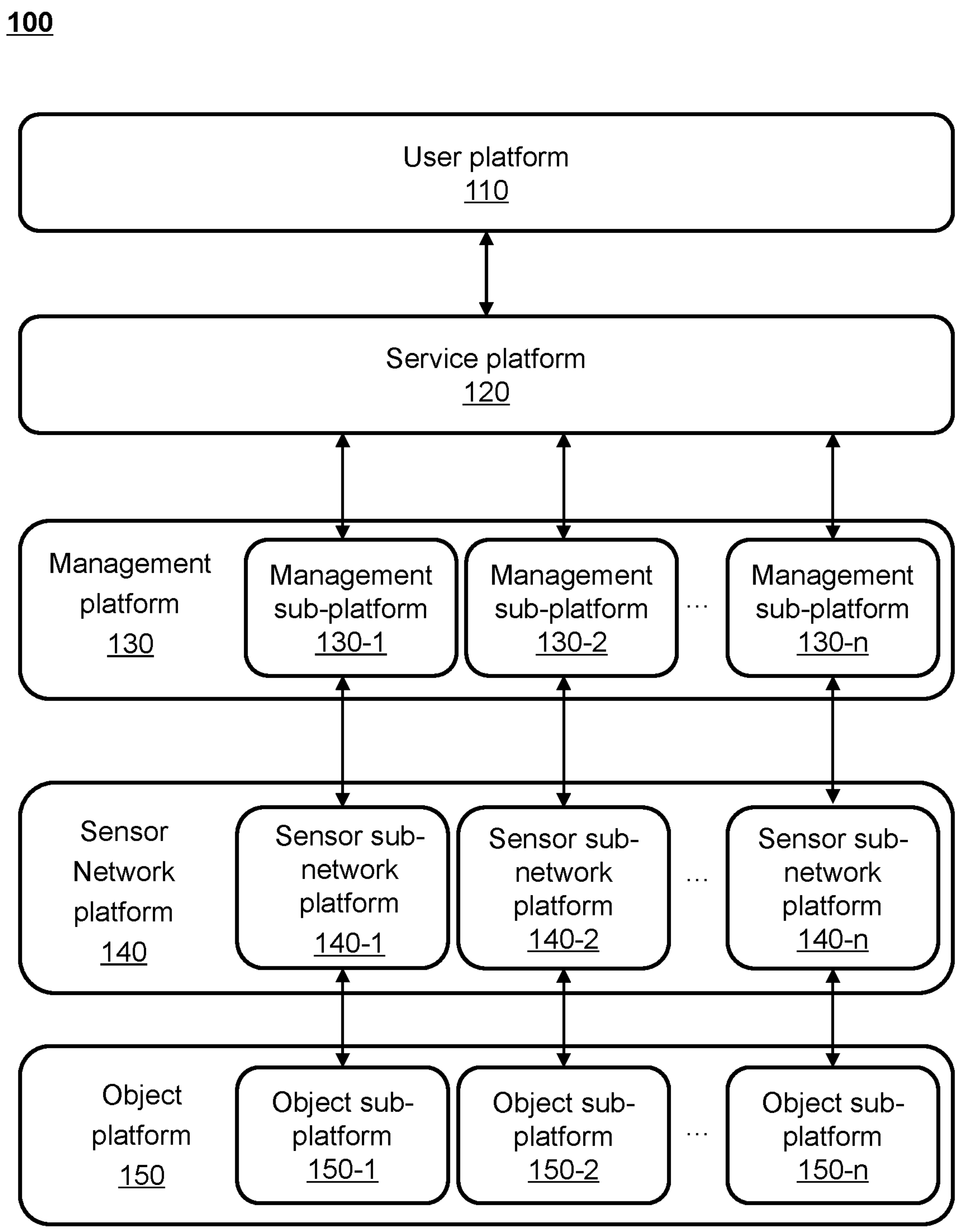
FIG. 1 is a schematic diagram illustrating an Internet of Things system for street management in a smart city according to some embodiments of the present disclosure.

In order to more clearly illustrate the technical solutions related to the embodiments of the present disclosure, a brief introduction of the drawings referred to the description of the embodiments is provided below. Obviously, the drawings described below are only some examples or embodiments of the present disclosure. Those having ordinary skills in the art, without further creative efforts, may apply the present disclosure to other similar scenarios according to these drawings. Unless obviously obtained from the context or the context illustrates otherwise, the same numeral in the drawings refers to the same structure or operation.

It should be understood that the "system," "device," "unit," and/or "module" used herein are one method to distinguish different components, elements, parts, sections, or assemblies of different levels. However, if other words can achieve the same purpose, the words can be replaced by other expressions.

As used in the disclosure and the appended claims, the singular forms "a," "an," and "the" include plural referents unless the content clearly dictates otherwise; the plural forms may be intended to include singular forms as well. In general, the terms "comprise," "comprises," and/or "comprising," "include," "includes," and/or "including," merely prompt to include steps and elements that have been clearly identified, and these steps and elements do not constitute an exclusive listing. The methods or devices may also include other steps or elements.

The flowcharts used in the present disclosure illustrate operations that the system implements according to the embodiment of the present disclosure. It should be understood that the foregoing or following operations may not necessarily be performed exactly in order. Instead, the operations may be processed in reverse order or simultaneously. Besides, one or more other operations may be added to these processes, or one or more operations may be removed from these processes.

FIG. 1 is a schematic diagram illustrating an Internet of Things system for street management in a smart city according to some embodiments of the present disclosure.

In some embodiments, the Internet of Things system 100 for street management in a smart city may be applied to a city appearance management system of a target area and used to execute a method for street management in a smart city. The target area may be an execution object of the Internet of Things system 100 for street management in a smart city. The Internet of Things system 100 for street management in a smart city may determine a fallen leaf cleaning route in the target area according to monitoring information of each street in the target area, so as to realize timely cleaning of fallen leaves in the target area.

As shown in FIG. 1, the Internet of Things system 100 for street management in a smart city may include: a user platform 110, a service platform 120, a management platform 130, a sensor network platform 140, and an object platform 150 that interact in sequence.

The user platform 110 may be a user-oriented platform. In some embodiments, the user platform 110 may be configured as a terminal device (such as a mobile phone, a tablet computer, etc.), which may feedback the fallen leaf cleaning route and related information of the target area to the user.

In some embodiments, the user platform 110 may interact downward with the service platform 120. For example, the user platform 110 may issue a fallen leaf cleaning route query instruction to the service platform 120 and receive fallen leaf cleaning route information uploaded by the service platform 120. The fallen leaf cleaning route query instruction configured to view the specific cleaning route or other relevant information (e.g., a fallen leaf condition of each street, a street to be cleaned, etc.) in the target area may refer to an instruction issued by relevant staff (e.g., a driver of a cleaning vehicle, etc.) or automatically issued on time.

The service platform 120 may refer to a platform that provides the user with a query service for the fallen leaf cleaning route in various areas of the city. In some embodiments, the service platform may employ a centralized arrangement. The centralized arrangement may mean that reception, processing, and transmission of data or/and information are carried out by the platform in a unified manner.

In some embodiments, the service platform 120 may interact downward with the management platform 130. For example, the service platform 120 may issue the fallen leaf cleaning route query instruction of the target area and/or each sub-area thereof to the management platform 130 and receive the fallen leaf cleaning route uploaded by the management platform 130.

In some embodiments, the service platform 120 may interact upward with the user platform 110. For example, the service platform 120 may receive a fallen leaf cleaning route query instruction issued by the user platform 110 and upload the fallen leaf cleaning route and the relevant information to the user platform 110, or the like.

The management platform 130 may be a platform for executing a method for street management in a smart city. In some embodiments, the management platform 130 may also be used to, in response to the query requirement of the user, process the relevant monitoring data of various areas of the city uploaded by the sensor network platform to determine the fallen leaf cleaning route of the target area.

In some embodiments, the management platform 130 may be arranged independently. That is, as shown in FIG. 1, the management platform 130 may include a plurality of management sub-platforms (e.g., management sub-platforms 130-1, 130-2, . . . , **130-*n***). Each management sub-platform may operate independently and may be used to manage the information of an area corresponding to the management sub-platform.

In some embodiments, the management sub-platform may be in one-to-one correspondence with the target area. In some embodiments, the correspondence between the management sub-platform and the target area may be determined according to an actual relationship. For example, each management sub-platform may correspond to each city. Exemplarily, the management platform 130 may include a management sub-platform A and a management sub-platform B. If the management sub-platform A corresponds to city A, the management sub-platform A may process the street monitoring information of city A, so as to determine the fallen leaf cleaning route of city A. If the management sub-platform B corresponds to city B, the management sub-platform B may process the street monitoring information of city B, so as to determine the fallen leaf cleaning route of city B.

In some embodiments, considering that the management sub-platform is in one-to-one correspondence with each target area, some sensor network sub-platforms set in the target area may communicate with the management sub-platform corresponding to the sensor network sub-platform, and send the street monitoring information collected by the object platform set in the target area to the management sub-platforms corresponding to the sensor network sub-platform.

In some embodiments, the management platform 130 may interact downward with the sensor network platform 140. The management platform 130 or each management sub-platform may receive relevant data (e.g., street monitoring information) of the target area corresponding to the management sub-platform uploaded by the sensor network sub-platform corresponding to the management sub-platform. The management platform 130 or each management sub-platform may also issue an instruction to obtain relevant data to each sensor network sub-platform. In some embodiments, the management platform 130 or each management sub-platform may also send the fallen leaf cleaning route to each cleaning vehicle in the object platform through the sensor network sub-platform corresponding to the management sub-platform.

In some embodiments, the management platform 130 may interact upward with the service platform 120. The management platform or each management sub-platform may receive the fallen leaf cleaning route query instruction issued by the service platform 120. The management platform 130 or each management sub-platform may upload the fallen leaf cleaning route and relevant information (e.g., fallen leaves on the street, a cleaning result, etc.) to the service platform 120.

In some embodiments, the Internet of Things system 100 for street management in a smart city may further include the sensor network platform 140. The sensor network platform 140 may be a platform for obtaining relevant monitoring data of various areas of the city. In some embodiments, the sensor network platform 140 may be configured as a communication network and gateway.

In some embodiments, the sensor network platform 140 may be arranged independently. That is, as shown in FIG. 1, the sensor network platform 140 may include a plurality of sensor sub-network platforms (e.g., sensor sub-network platforms 140-1, 140-2, . . . , 140-*n*). Each sensor sub-network sub-platform may operate independently and may be in one-to-one correspondence with the management sub-platform, which may be used to realize communication between the management sub-platform corresponding to the sensor sub-network sub-platform and the object platform in the target area corresponding to the sensor sub-network sub-platform.

In some embodiments, the sensor network platform 140 may interact downward with the object platform 150. For example, the sensor network platform 140 may receive data related to fallen leaves uploaded by the target platform and issue an instruction to obtain the data related to fallen leaves to the object platform.

In some embodiments, the sensor network platform 140 may also interact upward with the management platform 130. For example, the sensor network platform 140 may receive an instruction issued by the management platform 130 to obtain the data related to fallen leaves and upload the data related to fallen leaves of the sensor network platform or the sensor network sub-platform to the management platform 130 or the management sub-platform corresponding to the sensor network platform.

In some embodiments, the Internet of Things system 100 for street management in a smart city may also include the object platform 150. The object platform 150 may be a platform for obtaining relevant monitoring data of a target area, and may be deployed in different target areas. In some embodiments, the object platform may be configured as a monitoring device, a cleaning vehicle and a relevant device of each target area.

In some embodiments, the object platform 150 may be divided into a plurality of object sub-platforms (such as object sub-platforms 150-1, 150-2, . . . , 150-*n*) according to setting of each smart object within the platform (e.g., a position). In some embodiments, a manner for dividing the object sub-platforms may be consistent with the target area, that is, for each target area, the smart object that sets in the target area may be regarded as the object sub-platform corresponding to the target area. During work, the object sub-platform may be used to obtain the information related to fallen leaves in the target area and send the information to the corresponding management sub-platform through the corresponding sensor network sub-platform.

In some embodiments, the object platform 150 may interact upward with the sensor network platform 140. The object platform 150 may receive an instruction to obtain data related to fallen leaves issued by the sensor network sub-platform and upload the data related to fallen leaves to the corresponding sensor network sub-platform.

In some embodiments, the management platform 130 may be used to execute a method for street management in a smart city. The method for street management in a smart city may include: obtaining, based on the object platform, street monitoring information of a target area through the sensor network platform; determining, according to the street monitoring information, distribution of fallen leaves on the street, the distribution of fallen leaves including a total amount of fallen leaves and a count of fallen leaf piles; determining, based on the distribution of fallen leaves, cleaning difficulty of each street in the target area; determining, based on the total amount of fallen leaves and the cleaning difficulty, at least one street to be cleaned from the target area; and; and determining, based on the at least one street to be cleaned, a fallen leaf cleaning route of the target area. For more description about the method for street management in a smart city, please refer to FIG. 2 and related description thereof.

Some embodiments of the present disclosure also provide a non-transitory computer-readable storage medium storing computer instructions. When the computer instructions are executed by a processor, the method for street management in a smart city may be implemented.

It should be noted that the above description of the Internet of Things system for street management in a smart city and its modules is merely for the convenience of description, and not intended to limit the present disclosure to the scope of the illustrated embodiments. It can be understood that for those skilled in the art, after understanding the principle of the system, it is possible to arbitrarily combine various modules, or form subsystems to connect with other modules without departing from the principle. In some embodiments, the user platform 110, the service platform 120, the management platform 130, the sensor network platform 140, and the object platform 150 disclosed in FIG. 1 may be different modules in a system or may be a module implementing the functions of the two or more modules. For example, each module may share one storage module. Each module may also have its own storage module. Such deformations are all within the protection scope of the present disclosure.

Figure 2:
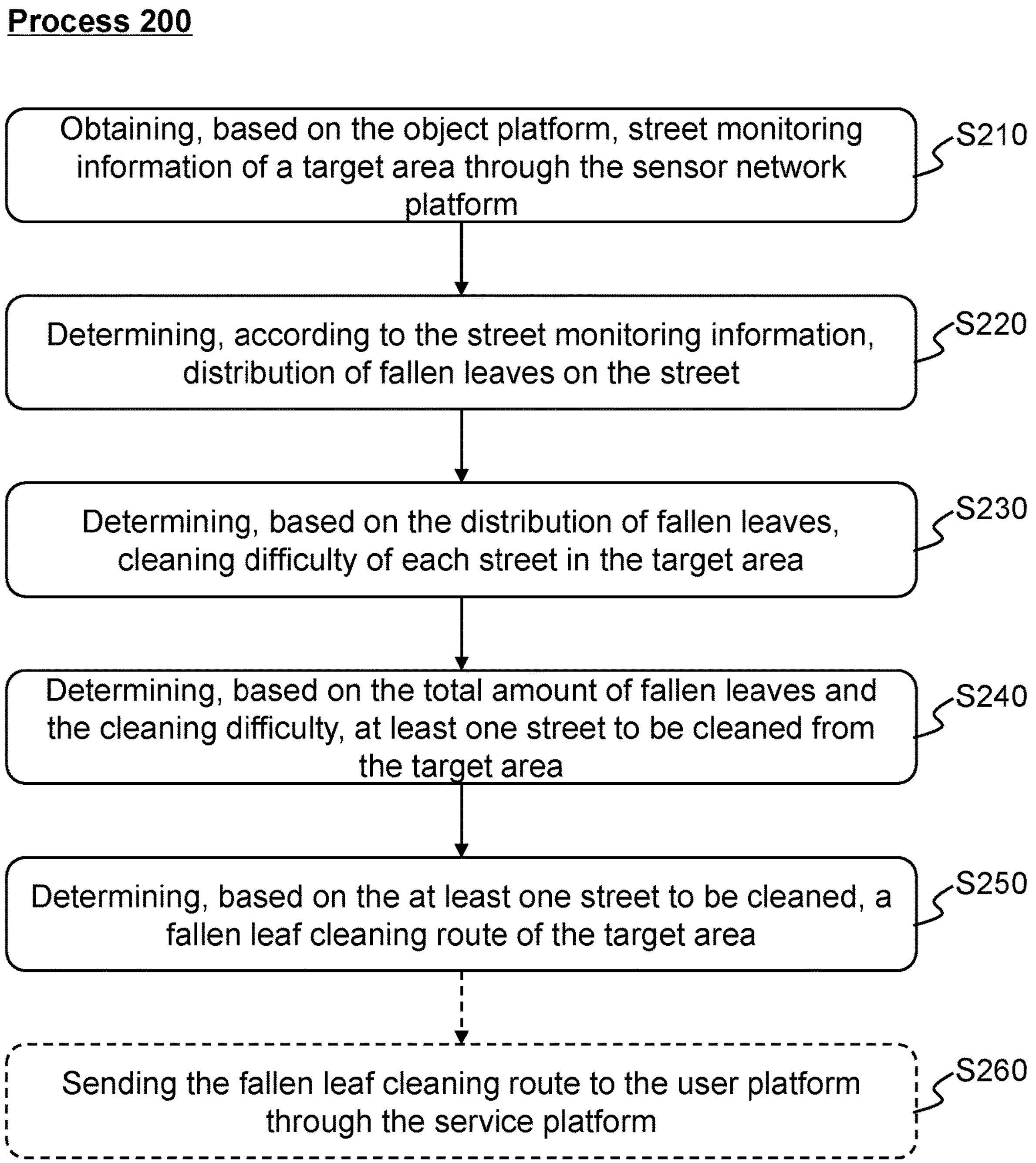
FIG. 2 is a flowchart illustrating an exemplary process for managing a street in a smart city according to some embodiments of the present disclosure.

FIG. 2 is a flowchart illustrating an exemplary process for street management in a smart city according to some embodiments of the present disclosure. In some embodiments, the process 200 may be performed by management platform 130.

As shown in FIG. 2, the process 200 may include the following operations.

In 210, obtaining, based on an object platform, street monitoring information of a target area through a sensor network platform.

In some embodiments, the method for street management in a smart city provided by the present disclosure may be applied to the target area. That is, the Internet of Things system for street management in a smart city provided in the present disclosure may be arranged in the target area to realize management of the fallen leaf cleaning route in the target area. The target area may be set according to an actual need. For example, the target area may be each district of the city. As another example, the target area may also be an area (such as a park) where there is a need for pavement cleaning.

The street monitoring information may refer to monitoring data of each street in the target area. For example, the street monitoring information may include monitoring images of each street. In some embodiments, the street monitoring information may reflect fallen leaves in the target area. For example, the street monitoring information may include monitoring images of streets with fallen leaves on the pavement during the period of leaf falling.

In some embodiments, the street monitoring information may be obtained by a sensor (e.g., a camera) of the object platform. The sensor of the object platform may be in one-to-one correspondence with a street where the sensor is set. When the sensor uploads the monitoring image, an actual monitoring range of the monitoring image may be determined according to a port that receives the monitoring image.

In some embodiments, the street monitoring information detected by the object platform may be periodically sent to the management platform through the sensor network platform as needed. For example, during the fallen leaf season (e.g., autumn and winter) of street trees (i.e., trees planted on both sides of the street), the object platform may automatically detect the street monitoring information and periodically upload the street monitoring information through the sensor network platform.

In 220, determining, according to the street monitoring information, distribution of fallen leaves on the street.

The distribution of fallen leaves may reflect the distribution of fallen leaves on the street pavement. The distribution of fallen leaves may at least include a total amount of fallen leaves and a count of fallen leaf piles. The total amount of fallen leaves may refer to a total amount of fallen leaves falling on the street pavement in each street. The count of fallen leaf piles may refer to a total count of fallen leaf piles in the street.

The fallen leaf pile may refer to a fallen leaf settlement naturally or artificially formed in the street. For example, the fallen leaf pile may include a fallen leaf pile swept by a sanitation worker. As another example, the fallen leaf pile may also include a natural fallen leaf pile surrounding a tree. In some embodiments, a fallen leaf piles may be characterized as a collection of fallen leaves whose distance is less than a preset distance threshold (e.g., 5 cm). For example, if the distance between a fallen leaf and other fallen leaves in the monitoring image is greater than the preset distance threshold (e.g., 5 cm), the leaf may also be regarded as an isolated fallen leaf pile.

In some embodiments, the distribution of fallen leaves may be determined by an object identification model. That is, the street monitoring information (such as monitoring images) may be processed through the object identification model to determine the distribution of fallen leaves. The object identification model may be a machine learning model or a related algorithm. For example, the object identification model may be a trained convolutional neural network (CNN). As another example, the object identification model may be an object detection algorithm (such as a yolo algorithm) with set parameters.

In some embodiments, the object identification model may be trained by training data labelled with fallen leaf piles, so as to identify the fallen leaf piles in the monitoring image and determine the distribution of fallen leaves. That is, the training data of the object identification model may include a training sample and a sample label. The training sample may be a historical monitoring image containing fallen leaves on the ground. The sample label may be a fallen leaf pile that are manually labelled in the image (for example, a frame of the fallen leaf pile manually labelled in the monitoring image).

In some embodiments, the object identification model may also be trained by training data labelled with each leaf to determine the fallen leaves in the monitoring image, determine the fallen leaf piles of based on a clustering algorithm, and determine the distribution of fallen leaves.

In 230, determining, based on the distribution of fallen leaves, cleaning difficulty of each street in the target area.

The cleaning difficulty may reflect difficulty of a cleaning tool to clean the fallen leaves on a pavement of each street. The cleaning difficulty may be related to an actual cleaning requirement of the cleaning vehicle. For example, when a cleaning vehicle is used to clean the fallen leaves on the street, it may be easier for the cleaning vehicle to clean the fallen leaves on the street if the fallen leaves are manually piled up. If the fallen leaves are not piled up and scattered on the street, it may be not easy for the cleaning vehicle to clean the fallen leaves on the street.

In some embodiments, the cleaning difficulty may be determined according to correlation between various parameters in the distribution of fallen leaves and the cleaning difficulty. The count of fallen leaves may be positively correlated with the cleaning difficulty. The total amount of fallen leaves may be positively correlated with the cleaning difficulty. For example, if the count of fallen leaf piles is relatively large and the fallen leaves are relatively scattered, the cleaning difficulty may be relatively large. If the count of fallen leaf piles is relatively small and the fallen leaves are relatively centralized, the cleaning difficulty may be relatively small.

In some embodiments, the cleaning difficulty may be also positively correlated to wind strength, that is, the stronger the wind, the more easily the fallen leaves move with the wind, so that the leaves may be scattered, and at the same time, the leaves may be more likely to be generated, thereby increasing the cleaning difficulty.

In some embodiments, it may be also possible to quantitatively analyze the distribution of fallen leaves by determining the dispersion degree of fallen leaves according to the distribution degree of fallen leaves, so as to determine the cleaning difficulty. More description about the dispersion degree of fallen leaves may be found in FIG. 3 and related descriptions thereof.

It should be noted that the fallen leaf cleaning route in the present disclosure is mainly a cleaning route of the cleaning vehicle, and the corresponding cleaning difficulty is the cleaning difficulty is the difficulty of the cleaning vehicle to clean the fallen leaves on the road. When the cleaning route of other cleaning tools or personnel needs to be calculated, the relevant parameters for determining the cleaning difficulty may be adjusted according to an actual situation.

In 240, determining, based on the total amount of fallen leaves and the cleaning difficulty, at least one street to be cleaned from the target area.

The street to be cleaned may refer to a street where fallen leaves on the pavement need to be cleaned. For example, the street to be cleaned may be a street to be cleaned whose total amount of fallen leaves and cleaning difficulty meet preset cleaning conditions. Exemplarily, the street to be cleaned may be a street with a relatively large number of fallen leaves, but the fallen leaves may be easily cleaned by a cleaning vehicle after being preliminarily piled up.

In some embodiments, the preset cleaning conditions may include a threshold for the total amount of fallen leaves and a cleaning difficulty threshold. When the total amount of fallen leaves is larger than the threshold for the total amount of fallen leaves and the cleaning difficulty is smaller than the cleaning difficulty threshold, the corresponding street may be regarded as the street to be cleaned.

In 250, determining, based on the at least one street to be cleaned, a fallen leaf cleaning route of the target area.

The fallen leaf cleaning route may be a cleaning sequence of the cleaning vehicle on each street to be cleaned. The fallen leaf cleaning route may include each street to be cleaned.

In some embodiments, a fallen leaf cleaning route may be determined based on a spatial relationship of each street to be cleaned. For example, a fallen leaf cleaning route may be determined based on a route planning algorithm (such as a simulated annealing algorithm, an artificial potential field method, a fuzzy logic algorithm, etc.).

In some embodiments, considering that attributes of each street to be cleaned are inconsistent (e.g., the cleaning difficulty of each street to be cleaned is different), a fallen leaf cleaning route may be determined based on a reinforcement learning algorithm (e.g., a Markov decision process). More description about the reinforcement learning algorithm may be found in FIG. 4 and related description.

In some embodiments, considering that the method for street management in a smart city provided by the present disclosure can be applied to a plurality of target areas at the same time, the management platform may include a plurality of management sub-platforms corresponding to the plurality target areas, and the above process 200 may also be executed by the management sub-platforms corresponding to various target areas. The management platform may include at least one management sub-platform. The sensor network platform may include at least one sensor network sub-platform. One of the at least one sensor network sub-platform may correspond to one of the target areas. One of the at least one management sub-platform may correspond to one of the sensor network sub-platforms.

When the management sub-platform executes the process 200, the street monitoring information of the target area may be obtained based on some object platforms (also referred to as object sub-platforms) set in the target area and may be transmitted to the management sub-platform corresponding to the sensor network sub-platform based on the sensor network sub-platform corresponding to the target area. The management sub-platform may process the street monitoring information of the target area and determine the fallen leaf cleaning route of the target area.

In some embodiments, when the fallen leaf cleaning route of the target area is determined, the fallen leaf cleaning route may be presented to a user (e.g., a cleaning vehicle driver, related staff, etc.). As shown in FIG. 2, the process 200 may further include the following operation.

In 260, sending the fallen leaf cleaning route to the user platform through the service platform.

In some embodiments, the fallen leaf cleaning route of each target area determined by the management platform or the management sub-platform and relevant information may be stored on the service platform. When the user queries the fallen leaf cleaning route and/or other relevant information of the target area where the user is located through the user platform, the service platform may call the corresponding fallen leaf cleaning route and/or other relevant information according to the target area where the user is located. When the service platform has not recorded the data (that is, the method for street management of the target area has not been executed, and the fallen leaf cleaning route of the target area has not yet been determined), an instruction may be sent to the corresponding management sub-platform to direct the corresponding management sub-platform to generate the fallen leaf cleaning route corresponding to the target area and other relevant information.

According to the method for street management in a smart city provided by some embodiments of the present disclosure, the distribution of fallen leaves in each street may be analyzed, the street to be cleaned suitable for the cleaning vehicle to clean may be determined, and the fallen leaf cleaning route may be generated, which can avoid the technical problem that the cleaning vehicle fails to clean due to untimely manual cleaning, and improve the automation degree of the cleaning vehicle.

Figure 3:
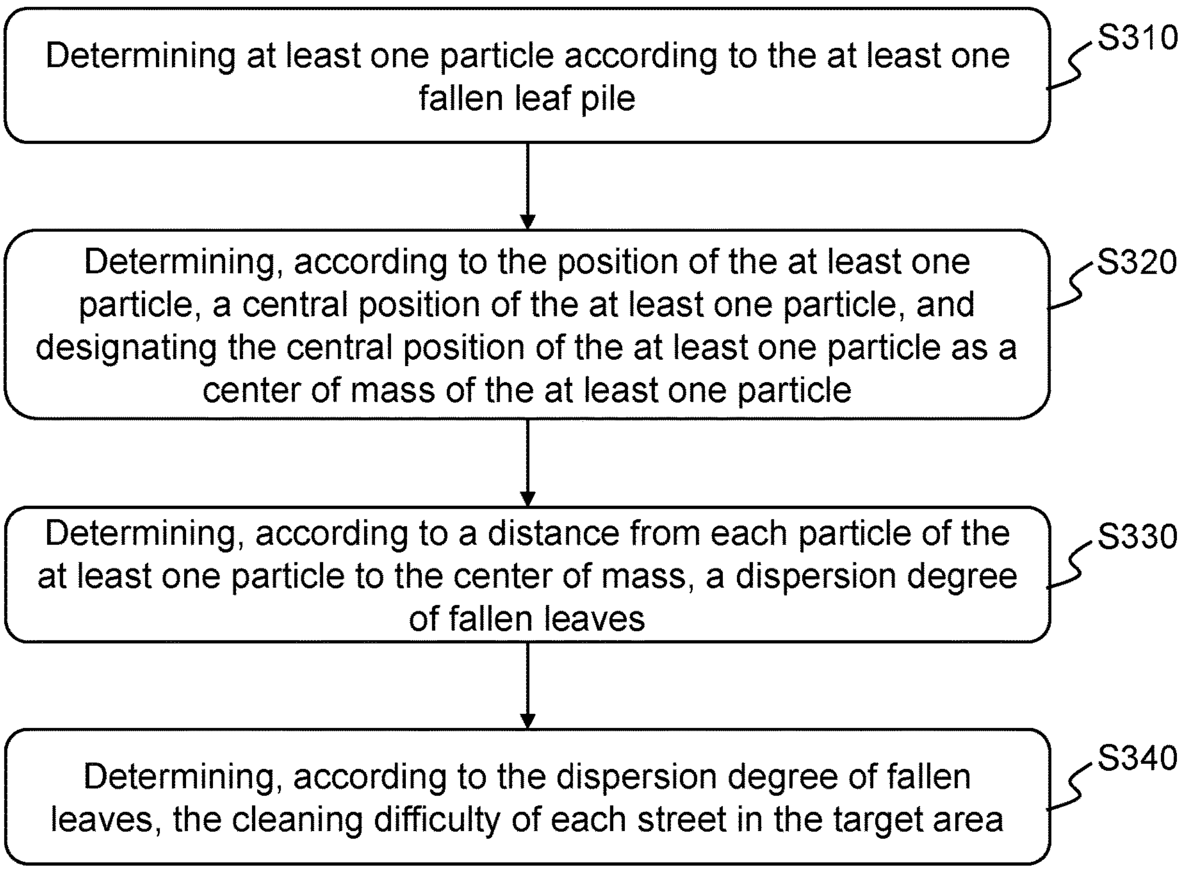
FIG. 3 is a flowchart illustrating an exemplary process for determining a cleaning difficulty according to some embodiments of the present disclosure.

FIG. 3 is a flowchart illustrating an exemplary process for determining a cleaning difficulty according to some embodiments of the present disclosure.

As shown in FIG. 3, the process 300 may include the following operations:

In 310, determining at least one particle according to the at least one fallen leaf pile.

In some embodiments, in order to analyze the fallen leaves on the street pavement, a center-of-mass system may be established according to the fallen leaves on the street pavement. The center-of-mass system may be composed of a plurality of particles. Each particle may characterize a fallen leaf pile on the street pavement. That is, each fallen leaf pile on the street pavement may correspond to each particle in the center-of-mass system.

In some embodiments, the particle may be characterized by mass and position. The position of the particle may be a position of a fallen leaf pile corresponding to the particle. The mass of the particle may be related to a size of a fallen leaf pile corresponding to the particle. For example, the mass of a particle may be determined from an extent of the fallen leaf pile (e.g., a longest radius of the fallen leaf pile). As another example, the mass of the particle may be determined according to a count of fallen leaves in the fallen leaf pile. Exemplarily, the mass of the particle corresponding to a fallen leaf pile formed by a single leaf may be 1, and the mass of the particle of other fallen leaf pile may be the count of fallen leaves of the fallen leaf pile.

In some embodiments, a mapping space of the street may be constructed based on an actual geographical condition of the street. The center-of-mass system may be formed according to a mapping relationship between the spaces and the corresponding particles of the fallen leaf piles on the street pavement in the mapping space.

In 320, determining, according to the position of the at least one particle, a central position of the at least one particle, and designating the central position of the at least one particle as the center of mass of the at least one particle.

The center of mass may refer to a midpoint of the center-of-mass system. For example, the center of mass may be a point in the mapping space from which a sum of distances to the position of each particle in the center-of-mass system is minimum. As another example, the center of mass may be a geometric center of the center-of-mass system.

In some embodiments, when the center of mass is the point in the mapping space from which the sum of the distances to the position of each particle in the center-of-mass system is minimum, to determine the center of mass, a function that characterizes the sum of the distances from the center of mass to the position of each particle may be constructed using coordinates of the center of mass as variables. The minimum sum of distances may be taken as a function optimization objective, an optimal solution of the variables may be determined and may be used as the coordinates of the center of mass. In some embodiments, when the center of mass is the geometric center of the center-of-mass system, to determine the center of mass, average values of the coordinates may also be calculated according to the coordinates of each particle and may be used as the coordinates of the center of mass.

In 330, determining, according to a distance from each particle of the at least one particle to the center of mass, a dispersion degree of fallen leaves.

The dispersion degree of fallen leaves may characterize a dispersion degree of fallen leaves on the street pavement. The dispersion degree of the particles in the center-of-mass system may be characterized as the dispersion degree of the center-of-mass system. That is to say, the more dispersed, the more numerous of each particle, and the smaller the mass of each particle in the center-of-mass system, the more dispersed the particles in the center-of-mass system and the higher the dispersion degree of the center-of-mass system. Considering the correspondence between the center-of-mass system and the fallen leaves on the street pavement, the dispersion degree of the center-of-mass system may be regarded as the dispersion degree of fallen leaves.

In some embodiments, a distance from each particle to the center of mass in the center-of-mass system may be calculated first, and then each distance may be processed based on a statistical algorithm to determine the dispersion degree of the center-of-mass system. The statistical algorithm may include calculating a variance, an average value, a cumulative sum, or the like, or any combination thereof. For example, the variance of the distances from each particle to the center of mass may be calculated and used as the dispersion degree of the center-of-mass system.

In some embodiments, when the dispersion degree of fallen leaves is calculated, a weight may be put on each fallen leaf pile and weighting processing may be performed. That is, the weight of each particle of the at least one particle may be determined according to the mass of the at least one particle. Then, according to the weight of each particle of the at least one particle, the distance from each particle to the center of mass may be weighted to determine the dispersion degree of fallen leaves. For more description of the mass of the particle, please refer to the related description of the operation 310.

In some embodiments, a relationship between the weight and the mass of the particle may be determined according to an actual need. For example, the weight may be negatively correlated with the mass of the particle, thereby increasing the weight of the fallen leaf pile formed by a single leaf or few leaves, and when there are many fallen leaf piles formed by a single leaf or few leaves in the street, the dispersion degree of fallen leaves in the street may be improved. As another example, the weight may be positively correlated with the mass of particle, therefore, the dispersion degree of fallen leaves determined may reflect the dispersion degree of each large fallen leaf pile.

In 340, determining, according to the dispersion degree of fallen leaves, the cleaning difficulty of each street in the target area.

In some embodiments, the dispersion degree of fallen leaves may be positively correlated with the cleaning difficulty. The cleaning difficulty may be directly determined according to the dispersion degree of fallen leaves. In some embodiments, considering the influence of other factors on the cleaning difficulty, the dispersion degree of fallen leaves may be comprehensively analyzed with other factors (such as wind strength, natural leaf falling speed, etc.), so as to determine the cleaning difficulty. For example, for each factor that affects the cleaning difficulty, the cleaning difficulty caused by each factor may be calculated (such as the cleaning difficulty caused by the dispersion degree of fallen leaves, the cleaning difficulty caused by wind, and the cleaning difficulty caused by natural leaf falling). Then the cleaning difficulty of fallen leaves on street pavement can be determined by weighting the cleaning difficulty caused by each factor.

Based on the cleaning difficulty determination manner of some embodiments of the present disclosure, the fallen leaves on the street pavement may be modeled through the center-of-mass system, the dispersion degree of the fallen leaves on the street may be quantitatively analyzed, and then the cleaning difficulty of the street may be analyzed, which may improve the ability to characterize the cleaning difficulty itself and more accurately describe the cleaning difficulty for a cleaning vehicle to clean fallen leaves. In addition, other factors (such as wind strength, natural leaf falling speed, etc.) may be introduced to improve the characterization and accuracy of cleaning difficulty.

In some embodiments, a fallen leaf cleaning route may be determined based on a reinforcement learning strategy. In the reinforcement learning strategy, each cleaning vehicle that can intelligently clean the task in the target area may be used as an agent, a current position and a cleaning trajectory of the cleaning vehicle may be used as a state, and movement of the cleaning vehicle between the streets to be cleaned may be used as the action. The state of the agent may change with the action of the agent. For example, when the agent performs a task of going to street A for cleaning, the position of the agent may become street A, and street A may be added to its cleaning trajectory.

In the reinforcement learning process, each action may be evaluated through a reward and penalty function, a reward value of the action may be determined, and an action sequence with a maximum sum of reward values (referred to as a return value) may be taken as the fallen leaf cleaning route. The specific process of determining the fallen leaf cleaning route based on the return value may be found in FIG. 4.

Figure 4:
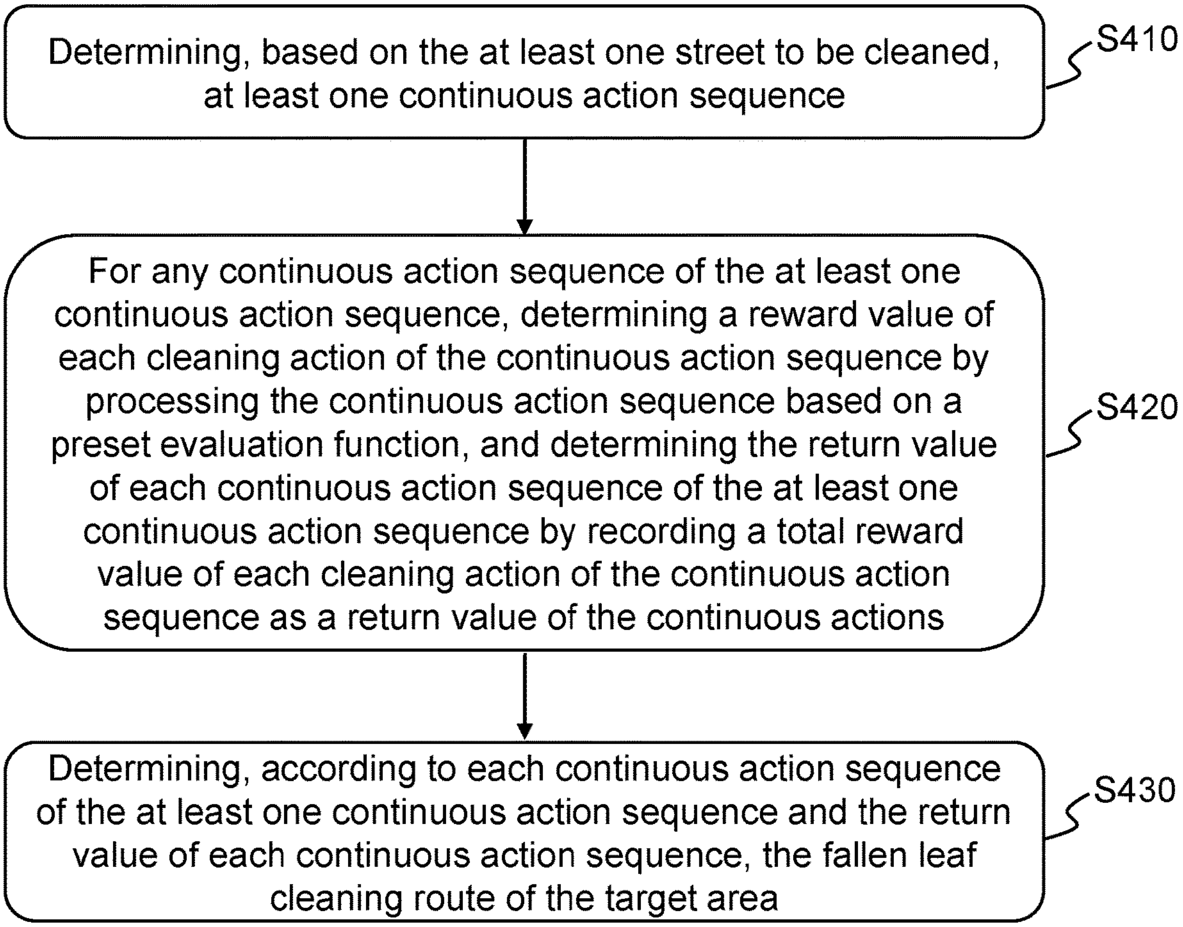
FIG. 4 is a schematic diagram illustrating a process for determining a fallen leaf cleaning route according to some embodiments of the present disclosure.

FIG. 4 is a schematic diagram illustrating a process for determining a fallen leaf cleaning route according to some embodiments of the present disclosure. As shown in FIG. 4, the process 400 may include the following operations.

In 410, determining, based on the at least one street to be cleaned, at least one continuous action sequence.

The continuous action sequence may include cleaning actions for each street to be cleaned. The continuous action sequence may cover all the streets to be cleaned. That is, after executing the continuous action sequence, an agent (cleaning vehicle) may complete cleaning tasks of all the street to be cleaned. The continuous action sequence may include an order in which each cleaning action is performed. For example, the continuous action sequence may be presented in the form of a sequence/vector, a position of each element may represent the order of the corresponding cleaning action in the continuous action sequence, and each element value may reflect the street to be cleaned corresponding to the specific cleaning action. Exemplarily, each street to be cleaned may be numbered, and the element value may use the serial number of the street to be cleaned to characterize the specific street to be cleaned corresponding to the cleaning action.

The cleaning actions may characterize a cleaning process of a certain street by the agent. For example, the cleaning actions may correspond to each street to be cleaned. When performing the cleaning actions, the agent (cleaning vehicle) may go to the street to be cleaned corresponding to the cleaning action and clean the street to be cleaned.

In some embodiments, considering that there may be a plurality of agents, i.e., a target area may include a plurality of independent cleaning vehicles, the corresponding continuous action sequence may include a plurality of groups of continuous actions, and each group of continuous actions may correspond to an agent used to characterize the cleaning order of the streets to be cleaned by the agent.

In some embodiments, the continuous action sequence of the streets to be cleaned may be determined directly from the streets to be cleaned. For example, a plurality of permutations and combinations of the streets to be cleaned may be randomly generated from all the streets to be cleaned and at least one continuous action sequence may be determined accordingly. As another example, according to a principle of proximity, a plurality of routes with a total driving distance within a preset range may be generated according to the streets to be cleaned, and at least one continuous action sequence may be determined accordingly.

In some embodiments, a continuous action sequence may be determined by iterative processing according to positions of the cleaning vehicles and the streets to be cleaned. For example, in a certain round of iterative processing, according to a state of the cleaning vehicle after a previous round of iterative processing, the street to be cleaned may be randomly determined from all the streets to be cleaned that have not yet been cleaned to determine the corresponding cleaning actions, and then some cleaning actions with a relatively large reward value may be selected from the randomly determined cleaning actions for state transition (i.e., an agent may go to the corresponding street to be cleaned for cleaning) to determine a state of the cleaning vehicle after this round of iterative processing (i.e., update the cleaning trajectory and a position of the agent) until cleaning tasks of all the streets to be cleaned are completed.

In 420, for any continuous action sequence of the at least one continuous action sequence, determining a reward value of each cleaning action of the continuous action sequence by processing the continuous action sequence based on a preset evaluation function, and determining the return value of each continuous action sequence of the at least one continuous action sequence by recording a total reward value of each cleaning action of the continuous action sequence as a return value of the continuous actions.

The evaluation function may evaluate an impact of performing the cleaning action to determine the reward value of the cleaning action. The reward value may reflect the impact of performing the cleaning action. For example, when a street corresponding to the cleaning action is difficult to clean or is more important in a traffic system, and the street may greatly improve the user's travel experience after cleaning, the cleaning action may have a relatively large reward value. As another example, when a street corresponding to the cleaning action is far away from a street corresponding to the previous action, and performing the cleaning action has relatively high time cost and space cost, the cleaning action may be assigned a relatively small reward value by the evaluation function.

In some embodiments, evaluation of each cleaning action by the evaluation function may also be performed when the continuous action sequence is determined. For example, when the action of the current state is determined, the reward value of each candidate cleaning action may be determined based on the evaluation function, the cleaning action of the current state may be determined based on a return value, and a next state may be determined. The return value of the continuous action sequence may be a sum of the reward value of each cleaning action in the continuous action sequence. After the reward value of the each cleaning action is determined, the reward value of each cleaning action may be summed to determine the return value of the continuous action sequence. For example, for a continuous action sequence (1, 5, 7, 8, 6, 4, 9, 2, 3), the reward value (10, 2, 6, 7, 5, 3, 2, 4, 5, 5) of each cleaning action may be calculated one by one, then the return value of the continuous action sequence may be the sum of the reward value of each cleaning action of 49.

In 430, determining, according to each continuous action sequence of the at least one continuous action sequence and the return value of each continuous action sequence, the fallen leaf cleaning route of the target area.

In some embodiments, the continuous action sequence with a largest return value of the continuous action sequences may be adopted, and the fallen leaf cleaning route of the target area may be determined according to an order where the agent arrives at each street in the continuous action sequence.

Based on the method for determining a fallen leaf cleaning route in some embodiments of the present disclosure, the evaluation of the return value of the continuous action sequence may be realized by evaluating the reward value of each action, so that the fallen leaf cleaning route determined based on the continuous action sequence may have a higher value from an overall perspective, which can improve the rationality of the fallen leaf cleaning route.

Figure 5:
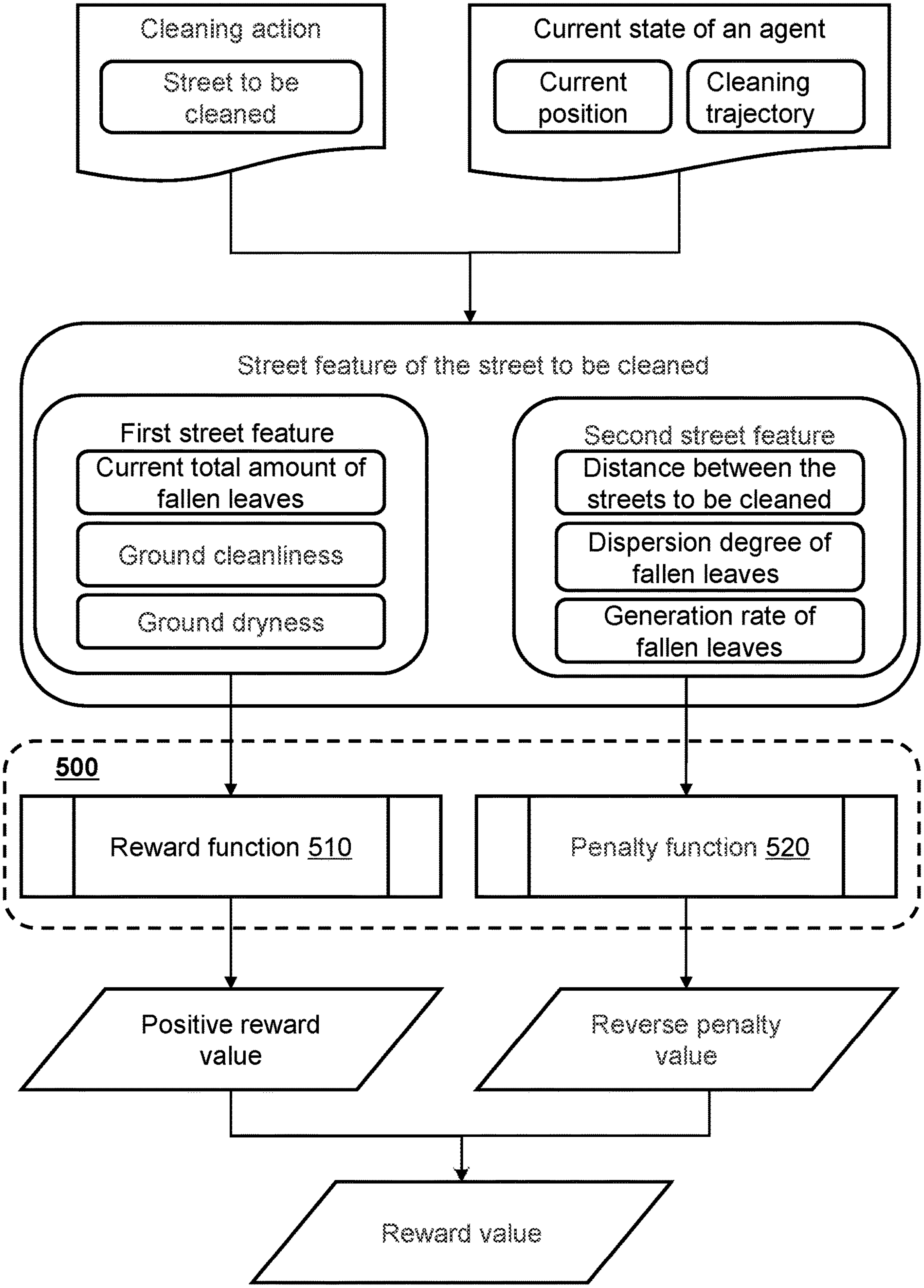
FIG. 5 is a schematic diagram illustrating an evaluation function according to some embodiments of the present disclosure.

FIG. 5 is a schematic diagram illustrating an evaluation function according to some embodiments of the present disclosure.

As shown in FIG. 5, when a reward value of a cleaning action is determined, the cleaning action and a current state may be input into the evaluation function 500. The reward value of the cleaning action may be determined by processing of the evaluation function 500.

The cleaning action (i.e., a street to be cleaned) and the current state of an agent (i.e., a current position and a cleaning trajectory) may be input into the evaluation function 500 to evaluate an impact of the cleaning action on the street to be cleaned, and the impact may be used as the reward value of the cleaning action.

In some embodiments, the evaluation function 500 may be a trained evaluation function during a reinforcement learning. For example, the evaluation function may include a common algorithm in the field of reinforcement learning such as a Q-Learning algorithm, a State-Action-Reward-State-Action (Sarsa) algorithm, a Deep Q Network (DQN) algorithm, a Policy-Gradients algorithm, an Actor-Critic algorithm, etc.

In some embodiments, the impact of performing a cleaning action on the street to be cleaned may include a positive impact and a negative impact. The positive impact may include a factor that is favorable for performing a cleaning action (e.g., small cleaning difficulty, ease of cleaning) and positive feedback (e.g., improved traffic efficiency) on an environment after cleaning actions is performed. The negative impact may include a factor that prevent the cleaning action from being performed (e.g., relatively high cleaning costs) and negative feedback (fallen leaves fall relatively fast after the cleaning action is performed and need to be cleaned again) from the environment after the cleaning action is performed.

In some embodiments, the evaluation function 500 may determine a positive reward value and a negative penalty value according to a street feature of the cleaning action, thereby determining the reward value of the cleaning action. For example, a difference between the positive reward value and the reverse penalty value may be taken as the reward value of the cleaning action. The positive reward value may be related to the positive impact of the cleaning action, and the reverse penalty value may be related to the negative impact of the cleaning action. For example, the positive reward value may include an impact on traffic after street cleaning, and the negative penalty value may include the spatiotemporal cost of cleaning the street.

In some embodiments, the current state of the agent (i.e., each cleaning vehicle) may be characterized by the current position of the agent and the route to be cleaned that the agent has completed. The cleaning action may be characterized by the street to be cleaned corresponding to the cleaning action. For example, the current state of the agent may be in street 3 to complete the cleaning of streets 1-9-5-7-3. The cleaning action may be street 4.

In some embodiments, the street feature of the street to be cleaned may be determined based on the current state of the agent and the street to be cleaned. The street feature may reflect features of the street to be cleaned. For example, the street feature may include a length of the street to be cleaned (e.g., a length of street 4), a total amount of fallen leaves (e.g., a total fallen leaves of street 4), a distance to the street to be cleaned (e.g., a distance from street 3 to street 4), etc.

In some embodiments, the street feature of the street to be cleaned may include a first street feature. The first street feature may be a portion of the street feature that is related to the positive impact of the cleaning action. For example, the first street feature may include a current total amount of fallen leaves on the street to be cleaned. The larger the current total amount of fallen leaves, the greater the count of fallen leaves in the street to be cleaned, and the more it may be necessary for cleaning vehicle to clean the street to be cleaned. The corresponding current total amount of fallen leaves may be positively correlated with the reward value of the cleaning action and the positive reward value of the cleaning action.

In some embodiments, the reward function 510 may be determined by splitting some operators of the evaluation function that are positively correlated with the reward value. The reward function 510 may process the first street feature to determine the positive reward value and then determine the reward value of the cleaning action based on the positive reward value.

In some embodiments, the first street feature may also include other street features related to the positive impact of the cleaning action such as ground cleanliness, ground dryness, etc.

The ground cleanliness may refer to cleanliness of the street pavement to be cleaned except for fallen leaves. The ground cleanliness may be determined based on street monitoring information of the street to be cleaned. When the ground cleanliness is low, there may be a large number of other pollutants (such as wrapping paper, bottles, etc.) on the street pavement to be cleaned. When the cleaning vehicle cleans the fallen leaves, as the cleaning vehicle cleans the ground, other pollutants may be also cleaned together, which may improve an actual value of the cleaning action. The corresponding ground cleanliness may be negatively correlated with the reward value and the positive reward value.

The ground dryness may characterize dryness of the street pavement to be cleaned. The ground dryness may be determined according to meteorological information. The higher the dryness of the ground, the lower the friction between the fallen leaves on the ground and the ground, and the easier it may be for the cleaning vehicle to clean the fallen leaves on the ground. That is, the higher the dryness of the ground, the easier it may be for the cleaning vehicle to perform fallen leaves cleaning. The corresponding ground dryness may be positively correlated with the reward value and the positive reward value.

In some embodiments, the reward value may further include a reverse reward value. When the reward value is determined, a second street feature of the street to be cleaned may be obtained. The second street feature may include a distance between the street to be cleaned and a street to be cleaned corresponding to a previous cleaning action. The reverse penalty value of the cleaning action by processing the second street feature based on a penalty function. The reward value of the cleaning action may be determined according to the positive reward value and the reverse penalty value.

In some embodiments, the street feature of the street to be cleaned may include the second street feature. The second street feature may be a portion of the street feature that is related to the negative impact of the cleaning action. For example, the second street feature may include a distance between the street to be cleaned in the current cleaning action and the street to be cleaned corresponding to the previous cleaning action (or a position of the agent in the current state). The larger the distance, the higher the time cost and space cost required by the agent to move. The corresponding distance may be negatively correlated with the reward value of the cleaning action and positively correlated with the reverse penalty value of the cleaning action.

In some embodiments, the penalty function 520 may be determined by splitting some operators of the evaluation function related to the negative impact of the cleaning action. The penalty function 520 may process the second street feature to determine the reverse penalty value and adjust the reward value of the cleaning action based on the reverse penalty value when the reward value based on the positive reward value is determined. For example, the reward value of the cleaning action may be the difference between the positive reward value of the cleaning action and the reverse penalty value of the cleaning action.

In some embodiments, the second street feature further may include a dispersion degree of fallen leaves and a generation rate of fallen leaves. The dispersion degree of fallen leaves may be seen in FIG. 3 and related descriptions thereof. When the dispersion degree of fallen leaves on the street is relatively large, it may mean that the fallen leaves on the street pavement are relatively scattered, and it may be difficult to clean directly based on the cleaning vehicle without manual preliminary piling up. That is, the higher the dispersion degree of fallen leaves, the larger the cleaning difficulty of the cleaning vehicle. The corresponding dispersion degree of fallen leaves may be negatively correlated with the reward value of the cleaning action and positively correlated with the reverse penalty value of the cleaning action.

The generation rate of fallen leaves may reflect a rate at which fallen leaves appear on the street pavement to be cleaned. The greater the generation rate of fallen leaves, the faster the fallen leaves appear on the street pavement, and the easier it may be to accumulate fallen leaves after cleaning, so that the cleaning vehicle may need to clean the street to be cleaned again. As a result, the greater the generation rate of fallen leaves, the more difficult it may be to clean. Therefore, the corresponding generation rate of fallen leaves may be negatively correlated with the reward value of the cleaning action, and positively correlated with the reverse penalty value of the cleaning action.

In some embodiments, when the generation rate of fallen leaves is determined, auxiliary evaluation information may be obtained first, and the generation rate of fallen leaves may be determined according to the auxiliary information. The auxiliary evaluation information may include at least one of a tree condition of the street to be cleaned, or a wind condition during a preset period of time. The specific correlation between the auxiliary evaluation information and the generation rate of fallen leaves may be determined based on historical data.

The tree condition may reflect growth of trees at the source of fallen leaves that fall on the street to be cleaned (such as street trees on both sides of the street to be cleaned and other trees that may have fallen leaves on the street to be cleaned). For example, the tree condition may include a tree planting density and a tree age. In some embodiments, the natural falling speed of fallen leaves of the tree may be estimated based on the tree condition. For example, the older the street tree on both sides of the street to be cleaned (such as a dead tree), the larger the tree canopy, the more the fallen leaves, and the greater the generation rate of fallen leaves.

The wind condition may include relevant information such as wind strength, wind direction, etc. of the street to be cleaned. The greater the wind strength, the more likely the leaves may fall, and the greater the generation rate of fallen leaves.

In some embodiments, the wind condition may be determined based on meteorological data.

In some embodiments, the wind condition during the preset period of time may include a wind condition during a period of time in the future. Therefore, the wind condition during a preset period of time may be determined by processing a known weather condition (such as a historical wind condition), thereby predicting a fallen leaf condition during a period of time in the future, which may be convenient to evaluate whether another street cleaning needs to be performed after the street to be cleaned is cleaned.

In some embodiments, the wind condition during a preset period of time may be determined by processing the weather condition based on a wind speed prediction model. The wind speed prediction model may be a long short-term memory model. An input of the wind speed prediction model may be a wind condition before a current moment, and an output may be a wind condition during a period of time in the future after the current moment.

In some embodiments, the wind speed prediction model may be trained based on the historical wind condition. The wind condition before a certain historical moment may be used as a training sample. The wind condition after a certain historical moment may be used as a training label. After the training sample is input into the wind speed prediction model, the model output may be compared with the training label to construct a loss function pair, thereby realizing the iteration of the parameters in the wind speed prediction model.

Based on the evaluation function provided by some embodiments of the present disclosure, the value of cleaning each street to be treated may be quantitatively evaluated, and the positive and negative impacts may be divided in detail, and a large number of related factors (such as ground cleanliness, ground dryness, generation rate of fallen leaves, etc.) may be introduced, which can improve a representation ability of reward value and improve calculation accuracy of return value of the continuous action sequence and reasonableness of fallen leaf cleaning route.

Having thus described the basic concepts, it may be rather apparent to those skilled in the art after reading this detailed disclosure that the foregoing detailed disclosure is intended to be presented by way of example only and is not limiting. Although not explicitly stated here, those skilled in the art may make various modifications, improvements and amendments to the present disclosure. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment is included in at least one embodiment of the present disclosure. Therefore, it is emphasized and should be appreciated that two or more references to "an embodiment" or "one embodiment" or "an alternative embodiment" in various parts of this specification are not necessarily all referring to the same embodiment. In addition, some features, structures, or features in the present disclosure of one or more embodiments may be appropriately combined.

Furthermore, the recited order of processing elements or sequences, or the use of numbers, letters, or other designations therefore, is not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. However, this disclosure does not mean that the present disclosure object requires more features than the features mentioned in the claims. Rather, claimed subject matter may lie in less than all features of a single foregoing disclosed embodiment.

In some embodiments, the numbers expressing quantities or properties used to describe and claim certain embodiments of the present disclosure are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the present disclosure are approximations, the numerical values set forth in the specific examples are reported as precisely as practicable.

Each of the patents, patent applications, publications of patent applications, and other material, such as articles, books, specifications, publications, documents, things, and/or the like, referenced herein is hereby incorporated herein by this reference in its entirety for all purposes, excepting any prosecution file history associated with same, any of same that is inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the present disclosure disclosed herein are illustrative of the principles of the embodiments of the present disclosure. Other modifications that may be employed may be within the scope of the present disclosure. Thus, by way of example, but not of limitation, alternative configurations of the embodiments of the present disclosure may be utilized in accordance with the teachings herein. Accordingly, embodiments of the present disclosure are not limited to that precisely as shown and described.

What is claimed is:

1. A method for determining a street cleaning route in a smart city implemented based on an Internet of Things system for determining the street cleaning route in the smart city, wherein the Internet of Things system for determining a street cleaning route in a smart city includes a management platform, a sensor network platform, an object platform, a user platform, and a service platform, the management platform includes at least one management sub-platform, and the sensor network platform includes at least one sensor network sub-platform; one of the at least one sensor network sub-platform corresponds to a target area; one of the at least one management sub-platform corresponds to one of the sensor network sub-platforms; street monitoring information of the target area is obtained based on the object platform and transmitted to the management sub-platform corresponding to the sensor network sub-platform based on the sensor network sub-platform corresponding to the target area; the sensor network platform is configured as a communication network and gateway; the object platform is configured as a monitoring device, a cleaning vehicle, and a relevant device of each target area; the user platform is configured as a terminal device, which feedbacks a fallen leaf cleaning route and related information of the target area to a user, the method is executed by the management platform, and the method comprises:

obtaining, based on the object platform, the street monitoring information of the target area through the sensor network platform;

determining, according to the street monitoring information, distribution of fallen leaves on the street, the distribution of fallen leaves including a total amount of fallen leaves and a count of fallen leaf piles, wherein the determining the distribution of fallen leaves on the street includes determining the distribution of fallen leaves by processing the street monitoring information through an object identification model, the object identification model being a machine learning model or a related algorithm;

wherein the object identification model is a trained convolutional neural network or an object detection algorithm with set parameters; the object identification model is trained by training data labelled with the fallen leaf piles; the training data of the object identification model includes a training sample and a sample label; the training sample is a historical monitoring image containing fallen leaves on ground, the sample label is a fallen leaf pile that is labelled in the historical monitoring image; and the determining the distribution of fallen leaves by processing the street monitoring information through an object identification model includes:

determining the fallen leaves in a monitoring image of the street monitoring information through the object identification model;

determining the fallen leaf piles based on a clustering algorithm; and determining the distribution of fallen leaves based on the fallen leaves and the fallen leaf piles;

determining, based on the total amount of fallen leaves and the count of fallen leaf piles, cleaning difficulty of each street in the target area; wherein the count of fallen leaf piles is positively correlated with the cleaning difficulty, and the total amount of fallen leaves is positively correlated with the cleaning difficulty;

determining, based on the total amount of fallen leaves and the cleaning difficulty, at least one street to be cleaned from the target area;

determining, based on the at least one street to be cleaned and a position of each cleaning vehicle, at least one continuous action sequence by iterative processing, the continuous action sequence including cleaning actions for each of streets to be cleaned;

wherein one round of the iterative processing includes:

randomly determining a street to be cleaned from at least one street to be cleaned that has not yet been cleaned to determine the corresponding cleaning actions based on a state of the cleaning vehicle after a previous round of the iterative processing;

selecting cleaning actions with a relatively large reward value from the randomly determined cleaning actions for state transition;

determining a state of the cleaning vehicle after a current round of the iterative processing based on a result of the state transition; and repeating the iterative processing until cleaning tasks of all the streets to be cleaned are completed;

for any continuous action sequence of the at least one continuous action sequence, determining a reward value of each cleaning action of the continuous action sequence by processing the continuous action sequence based on a preset evaluation function, and determining the return value of each continuous action sequence of the at least one continuous action sequence by recording a total reward value of each cleaning action of the continuous action sequence as a return value of the continuous actions, the preset evaluation function being a trained evaluation function during a reinforcement learning;

adopting a continuous action sequence with a largest return value of the at least one continuous action sequence, and determining, according to an order where the cleaning vehicle arrives at each street in the continuous action sequence, the return value of each continuous action sequence, the fallen leaf cleaning route of the target area;

sending the fallen leaf cleaning route to each cleaning vehicle in the object platform through the sensor network sub-platform corresponding to the management sub-platform;

receiving a fallen leaf cleaning route query instruction issued by the user platform through the service platform; and sending the fallen leaf cleaning route to the user platform through the service platform, including:

storing the fallen leaf cleaning route of each target area on the service platform; and in response to determining that the fallen leaf cleaning route query instruction is received, sending the fallen leaf cleaning route to the user platform by calling the fallen leaf cleaning route according to a target area where the user is located through the service platform.

2. The method of claim 1, wherein the determining a reward value of each cleaning action of the continuous action sequence by processing the continuous action sequence based on a preset evaluation function includes:

for each cleaning action, obtaining a first street feature of the street to be cleaned corresponding to the cleaning action, the first street feature including a current total amount of fallen leaves on the street to be cleaned;

determining a positive reward value of the cleaning action by processing the first street feature based on a reward function; and determining, according to the positive reward value, the reward value of the cleaning action.

3. The method of claim 2, wherein the first street feature further includes ground cleanliness and/or ground dryness.

4. The method of claim 2, wherein the determining, according to the positive reward value, the reward value of the cleaning action includes:

obtaining a second street feature of the street to be cleaned, the second street feature including a distance between the street to be cleaned and a street to be cleaned corresponding to a previous cleaning action;

determining a reverse penalty value of the cleaning action by processing the second street feature based on a penalty function; and determining the reward value of the cleaning action according to the positive reward value and the reverse penalty value.

5. The method of claim 4, wherein the second street feature further includes a dispersion degree of fallen leaves and a generation rate of fallen leaves, and the dispersion degree of fallen leaves and the generation rate of fallen leaves are positively correlated with the reverse penalty value.

6. The method of claim 5, wherein the generation rate of fallen leaves is determined based on a manner including:

obtaining auxiliary evaluation information, the auxiliary evaluation information including a tree condition of the street to be cleaned and/or a wind condition during a preset period of time, and the tree condition including a tree planting density and a tree age; and determining, according to the auxiliary evaluation information, the generation rate of fallen leaves.

7. The method of claim 1, further comprising:

determining the cleaning difficulty of each street in the target area according to wind strength; wherein an input of a wind speed prediction model is a wind condition before a current moment, an output is a wind condition during a period of time in a future after the current moment, and the wind condition includes the wind strength; the wind speed prediction model is a machine learning model, and the wind speed prediction model is obtained through training.

8. A non-transitory computer-readable storage medium storing computer instructions, wherein when the computer instructions are executed by a processor, the method for determining the street cleaning route in the smart city of claim 1 is implemented.

9. An Internet of Things system for determining a street cleaning route in a smart city including a management platform, a sensor network platform, an object platform, a user platform, and a service platform, wherein the management platform includes at least one management sub-platform, and the sensor network platform includes at least one sensor network sub-platform; one of the at least one sensor network sub-platform corresponds to a target area; one of the at least one management sub-platform corresponds to one of the sensor network sub-platforms; street monitoring information of the target area is obtained based on the object platform and transmitted to the management sub-platform corresponding to the sensor network sub-platform based on the sensor network sub-platform corresponding to the target area; the sensor network platform is configured as a communication network and gateway; the object platform is configured as a monitoring device, a cleaning vehicle, and a relevant device of each target area; the user platform is configured as a terminal device, which feedbacks a fallen leaf cleaning route and related information of the target area to a user and the management platform is configured to:

obtain, based on the object platform, the street monitoring information of the target area through the sensor network platform;

determine, according to the street monitoring information, distribution of fallen leaves on the street, the distribution of fallen leaves including a total amount of fallen leaves and a count of fallen leaf piles, wherein to determine the distribution of fallen leaves on the street, the management platform is further configured to:

determine the distribution of fallen leaves by processing the street monitoring information through an object identification model, the object identification model being a machine learning model or a related algorithm;

wherein the object identification model is a trained convolutional neural network or an object detection algorithm with set parameters; the object identification model is trained by training data labelled with the fallen leaf piles; the training data of the object identification model includes a training sample and a sample label; the training sample is a historical monitoring image containing fallen leaves on a ground, the sample label is a fallen leaf pile that is labelled in the historical monitoring image; and the determining the distribution of fallen leaves by processing the street monitoring information through an object identification model includes:

determine the fallen leaves in a monitoring image of the street monitoring information through the object identification model;

determine the fallen leaf piles based on a clustering algorithm; and determine the distribution of fallen leaves based on the fallen leaves and the fallen leaf piles;

determine, based on the total amount of fallen leaves and the count of fallen leaf piles, cleaning difficulty of each street in the target area; wherein the count of fallen leaf piles is positively correlated with the cleaning difficulty, and the total amount of fallen leaves is positively correlated with the cleaning difficulty;

determine, based on the total amount of fallen leaves and the cleaning difficulty, at least one street to be cleaned from the target area;

determine, based on the at least one street to be cleaned and a position of each cleaning vehicle, at least one continuous action sequence by iterative processing, the continuous action sequence including cleaning actions for each of streets to be cleaned;

wherein one round of the iterative processing includes:

randomly determining a street to be cleaned from at least one street to be cleaned that has not yet been cleaned to determine the corresponding cleaning actions based on a state of the cleaning vehicle after a previous round of the iterative processing;

selecting cleaning actions with a relatively large reward value from the randomly determined cleaning actions for state transition;

determining a state of the cleaning vehicle after a current round of the iterative processing based on a result of the state transition; and repeating the iterative processing until cleaning tasks of all the streets to be cleaned are completed;

for any continuous action sequence of the at least one continuous action sequence, determine a reward value of each cleaning action of the continuous action sequence by processing the continuous action sequence based on a preset evaluation function, and determine the return value of each continuous action sequence of the at least one continuous action sequence by recording a total reward value of each cleaning action of the continuous action sequence as a return value of the continuous actions, the preset evaluation function being a trained evaluation function during a reinforcement learning; and adopt a continuous action sequence with a largest return value of the at least one continuous action sequence, and determine, according to an order where the cleaning vehicle arrives at each street in the continuous action sequence the return value of each continuous action sequence, the fallen leaf cleaning route of the target area;

send the fallen leaf cleaning route to each cleaning vehicle in the object platform through the sensor network sub-platform corresponding to the management sub-platform;

receive a fallen leaf cleaning route query instruction issued by the user platform through the service platform; and send the fallen leaf cleaning route to the user platform through the service platform, wherein to send the fallen leaf cleaning route to the user platform through the service platform, the management platform is further configured to:

store the fallen leaf cleaning route of each target area on the service platform; and in response to determining that the fallen leaf cleaning route query instruction is received, send the fallen leaf cleaning route to the user platform by calling the fallen leaf cleaning route according to a target area where the user is located through the service platform.

10. The Internet of Things system of claim 9, wherein the management platform is further configured to:

for each cleaning action, obtain a first street feature of the street to be cleaned corresponding to the cleaning action, the first street feature including a current total amount of fallen leaves on the street to be cleaned;

determine a positive reward value of the cleaning action by processing the first street feature based on a reward function; and determine, according to the positive reward value, the reward value of the cleaning action.

11. The Internet of Things system of claim 10, wherein the first street feature further includes ground cleanliness and/or ground dryness.

12. The Internet of Things system of claim 10, wherein the management platform is further configured to:

obtain a second street feature of the street to be cleaned, the second street feature including a distance between the street to be cleaned and a street to be cleaned corresponding to a previous cleaning action;

determine a reverse penalty value of the cleaning action by processing the second street feature based on a penalty function; and determine the reward value of the cleaning action according to the positive reward value and the reverse penalty value.

13. The Internet of Things system of claim 12, wherein the second street feature further includes a dispersion degree of fallen leaves and a generation rate of fallen leaves, and the dispersion degree of fallen leaves and the generation rate of fallen leaves are positively correlated with the reverse penalty value.

14. The Internet of Things system of claim 13, wherein the management platform is further configured to:

obtain auxiliary evaluation information, the auxiliary evaluation information including a tree condition of the street to be cleaned and/or a wind condition during a preset period of time, and the tree condition including a tree planting density and a tree age; and determine, according to the auxiliary evaluation information, the generation rate of fallen leaves.

15. The Internet of Things system of claim 9, wherein the management platform is further configured to:

determine the cleaning difficulty of each street in the target area according to wind strength; wherein an input of a wind speed prediction model is a wind condition before a current moment, an output is a wind condition during a period of time in a future after the current moment, and the wind condition includes the wind strength; the wind speed prediction model is a machine learning model, and the wind speed prediction model is obtained through training.

* * * * *